United States Patent
Barjatiya et al.

(10) Patent No.: US 8,832,820 B2
(45) Date of Patent: Sep. 9, 2014

(54) ISOLATION AND SECURITY HARDENING AMONG WORKLOADS IN A MULTI-TENANT NETWORKED ENVIRONMENT

(75) Inventors: Saurabh Barjatiya, Hyderabad (IN); Kanaka P. Saripalli, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/531,761

(22) Filed: Jun. 25, 2012

(65) Prior Publication Data

US 2013/0347095 A1 Dec. 26, 2013

(51) Int. Cl.
| | |
|---|---|
| *G06F 17/00* | (2006.01) |
| *G06F 12/14* | (2006.01) |
| *H04L 29/06* | (2006.01) |
| *H04L 9/32* | (2006.01) |
| *G06F 15/173* | (2006.01) |
| *H04L 29/08* | (2006.01) |
| *H04L 12/26* | (2006.01) |

(52) U.S. Cl.
CPC ........ *H04L 63/0236* (2013.01); *H04L 63/1408* (2013.01); *H04L 63/0428* (2013.01); *H04L 29/06* (2013.01); *H04L 63/065* (2013.01); *H04L 63/08* (2013.01); *H04L 29/08099* (2013.01); *H04L 43/08* (2013.01)
USPC ............... 726/13; 726/22; 713/153; 713/163; 713/168; 709/224; 709/225

(58) Field of Classification Search
CPC ............ H04L 63/0236; H04L 63/1408; H04L 63/0428; H04L 63/065; H04L 63/08; H04L 29/06; H04L 29/08099; H04L 43/08
USPC ....................... 726/13, 22; 713/153, 163, 168; 709/224, 225
See application file for complete search history.

(56) References Cited

U.S. PATENT DOCUMENTS

| | | | | |
|---|---|---|---|---|
| 2005/0022030 | A1* | 1/2005 | Wesinger et al. | 713/201 |
| 2006/0007909 | A1* | 1/2006 | Borowski | 370/351 |

(Continued)

FOREIGN PATENT DOCUMENTS

EP 2378455 10/2011

OTHER PUBLICATIONS

Afore, CloudLink™Security and Management Software Suite, 2 pages, Jun. 2012.
Afore, CloudLink Empowers Enterprises to Securely Manage Data in the Cloud, URL: http://www.aforesolutions.com/products/cloud-security-management/cloudlink-overview/, 3 pages, Jan. 11, 2012.

(Continued)

*Primary Examiner* — Aravind Moorthy
(74) *Attorney, Agent, or Firm* — Schmeiser, Olsen & Watts, LLP; John Pivnichny (57) ABSTRACT

A method and associated systems for enhanced isolation and security hardening among multi-tenant workloads. An agent running on a processor of a networked computer system on which multicast and broadcast communications have been disabled captures an address-resolution query message from a querying tenant, converts the query message to a unicast message, and forwards the converted unicast query message to a switch. The switch forwards the converted unicast message to a redirection device and in response receives an address-resolution response message only after the redirection device verifies that the query and response messages comply with security policies. The switch forwards the address-resolution response to the querying tenant in conformance with security policies.

24 Claims, 4 Drawing Sheets

(56) References Cited

U.S. PATENT DOCUMENTS

| | | | |
|---|---|---|---|
| 2006/0069912 A1* | 3/2006 | Zheng et al. | 713/151 |
| 2009/0254990 A1 | 10/2009 | McGee | |
| 2011/0153909 A1 | 6/2011 | Dong | |
| 2011/0161665 A1* | 6/2011 | Perez | 713/161 |
| 2011/0302415 A1 | 12/2011 | Ahmad et al. | |
| 2012/0054486 A1 | 3/2012 | Lakkavalli et al. | |
| 2012/0257753 A1* | 10/2012 | Ochikubo et al. | 380/270 |
| 2013/0232492 A1* | 9/2013 | Wang | 718/1 |

OTHER PUBLICATIONS

Cloud Switch, Enterprise Cloud Computing Blog, URL: http://www.cloudswitch.com/blog/tag/cloud%20security%20model, 5 pages, May 10, 2012.

Cloud Switch, Making Cloud Computing Secure for the Enterprise, URL: http://www.vmware.com/appliances/directory/uploaded_files/va/10/08/05/Making%20the%20Cloud%20Secure%20for%20Enterprise%20-%20White%20Paper%200610,pdf, 14 pages, Oct. 2006.

* cited by examiner

ISOLATION AND SECURITY HARDENING AMONG WORKLOADS IN A MULTI-TENANT NETWORKED ENVIRONMENT

TECHNICAL FIELD

The present invention relates to security and isolation among tenants of multi-tenant networked virtual computing environments.

BACKGROUND

Virtualized networked computing platforms have long been a key information technology and are now becoming even more important due to the popularity of virtual computing platforms that support cloud-computing, Infrastructure as a Service ("IaaS"), Platform as a Service ("PaaS"), and Software as a Service ("SaaS") applications. But migration to virtualized platforms has been hindered by concerns about workload isolation and user security between tenants in networked virtual environments and between virtual machines of a single tenant in a networked virtual environment.

BRIEF SUMMARY

A first embodiment of the present invention provides a method for enhanced isolation and security hardening between workloads in a multi-tenant networked environment, said method comprising:

a querying networked entity generating and transmitting a broadcast or multicast query, wherein said broadcast or multicast query requests a media-access control address of a target networked entity, wherein said querying networked entity comprises a first processor of a first computer system or a first virtual machine running on a first processor of a first computer system, and wherein said target networked entity comprises a second virtual machine running on said first processor, a second processor of a second computer system, a second virtual machine running on a second processor of a second computer system, or a networked device;

a virtual-machine agent running on said first processor receiving said broadcast or multicast query, translating said broadcast or multicast query into a unicast query, and sending said unicast query to a switch running on said first processor, wherein said switch comprises a virtual switch or a software firewall;

said switch receiving and dropping said broadcast or multicast query, receiving and verifying said unicast query, and directly or indirectly forwarding said verified unicast query to a redirection device;

said switch directly or indirectly receiving a response from said redirection device, wherein said response identifies a media-access control address that enables communication with said target networked entity; said switch verifying said response and forwarding said verified response to said querying networked entity.

A second embodiment of the present invention provides a computer program product, comprising a computer-readable hardware storage device having a computer-readable program code stored therein, said program code configured to be executed by a first processor of a first computer system to implement a method for enhanced isolation and security hardening between workloads in a multi-tenant networked environment, said method comprising:

a querying networked entity generating and transmitting a broadcast or multicast query, wherein said broadcast or multicast query requests a media-access control address of a target networked entity, wherein said querying networked entity comprises said first processor of said first computer system or a first virtual machine running on said first processor of said first computer system, and wherein said target networked entity comprises a second virtual machine running on said first processor, a second processor of a second computer system, a second virtual machine running on a second processor of a second computer system, or a networked device;

a virtual-machine agent running on said first processor receiving said broadcast or multicast query, translating said broadcast or multicast query into a unicast query, and sending said unicast query to a switch running on said first processor, wherein said switch is comprises a virtual switch or a software firewall;

said switch receiving and dropping said broadcast or multicast query, receiving and verifying said unicast query, and directly or indirectly forwarding said verified unicast query to a redirection device;

said switch directly or indirectly receiving a response from said redirection device, wherein said response identifies a media-access control address that enables communication with said target networked entity; said switch verifying said response and forwarding said verified response to said querying networked entity.

A third embodiment of the present invention provides a first computer system comprising a first processor, a memory coupled to said first processor, and a computer-readable hardware storage device coupled to said first processor, said storage device containing program code configured to be run by said first processor via the memory to implement a method for enhanced isolation and security hardening between workloads in a multi-tenant networked environment, said method comprising:

a querying networked entity generating and transmitting a broadcast or multicast query, wherein said broadcast or multicast query requests a media-access control address of a target networked entity, wherein said querying networked entity comprises a first processor of a first computer system or a first virtual machine running on a first processor of a first computer system, and wherein said target networked entity comprises a second virtual machine running on said first processor, a second processor of a second computer system, a second virtual machine running on a second processor of a second computer system, or a networked device;

a virtual-machine agent running on said first processor receiving said broadcast or multicast query, translating said broadcast or multicast query into a unicast query, and sending said unicast query to a switch running on said first processor, wherein said switch comprises a virtual switch or a software firewall;

said switch receiving and dropping said broadcast or multicast query, receiving and verifying said unicast query, and directly or indirectly forwarding said verified unicast query to a redirection device;

said switch directly or indirectly receiving a response from said redirection device, wherein said response identifies a media-access control address that enables communication with said target networked entity; said switch verifying said response and forwarding said verified response to said querying networked entity.

A fourth embodiment of the present invention provides a process for supporting computer infrastructure, said process comprising providing at least one support service for at least one of creating, integrating, hosting, maintaining, and deploying computer-readable program code in a first computer system, wherein the program code in combination with said first computer system is configured to implement a method for enhanced isolation and security hardening between workloads in a multi-tenant networked environment, said method comprising:

a querying networked entity generating and transmitting a broadcast or multicast query, wherein said broadcast or multicast query requests a media-access control address of a target networked entity, wherein said querying networked entity comprises said first computer system or a first virtual machine running on a first processor of said first computer system, and wherein said target networked entity comprises a second virtual machine running on said first processor, a second processor of a second computer system, a second virtual machine running on a second processor of a second computer system, or a networked device;

a virtual-machine agent running on said first processor receiving said broadcast or multicast query, translating said broadcast or multicast query into a unicast query, and sending said unicast query to a switch running on said first processor, wherein said switch comprises a virtual switch or a software firewall;

said switch receiving and dropping said broadcast or multicast query, receiving and verifying said unicast query, and directly or indirectly forwarding said verified unicast query to a redirection device;

said switch directly or indirectly receiving a response from said redirection device, wherein said response identifies a media-access control address that enables communication with said target networked entity;

said switch verifying said response and forwarding said verified response to said querying networked entity.

DETAILED DESCRIPTION

Security and isolation of workloads are concerns for computer users who work in multi-tenant virtualized computing platforms such as platforms that support "cloud computing," Infrastructure as a Service ("IaaS"), Platform as a Service ("PaaS"), and Software as a Service ("SaaS") applications. Because many virtual computers can coexist on a single physical "base host" computer, it can be difficult to guarantee confidentiality, data security, and isolation between workloads running on virtual computers, wherein the virtual computers are hosted by the same physical base host computer, regardless of whether the workloads belong to the same tenant or to multiple tenants.

Analogous security and isolation requirements may exist between workloads running on virtual computers hosted by different physical base host computers attached to a network, or between a workload running on a physical base host computer and a workload running on an external device, wherein one or more of the workloads may be running in a virtualized environment hosted by one or more of the different physical base host computers or external devices and one or more of the workloads may be running in a nonvirtualized environment. Similar security and isolation requirements may exist between workloads running on different physical machines in a virtualized or nonvirtualized environment, wherein at least one of the workloads may be running on more than one of the different physical machines. Embodiments of the present invention may provide enhanced isolation and security between workloads in all these cases.

Workload isolation at the "link" or "data link" layer (also referred to as "layer 1" of the TCP/IP Internet communications stack) would harden security mechanisms more effectively than would solutions implemented at higher, more vulnerable layers. Embodiments of the present invention perform this task at the link layer through a method, computer program product, computer system, or service.

The communications infrastructure of the Internet may be modeled as a four-layer TCP/IP protocol stack. In this model, each logical protocol layer requests services from the protocol layer immediately below it. Embodiments of the present invention may be implemented in a networked environment based on a protocol stack other than the TCP/IP protocol stack, wherein the protocol stack other than the TCP/IP protocol stack may comprise layers similar to or analogous to the layers of the TCP/IP protocol stack.

The highest logical layer of the TCP/IP protocol stack is the layer 4 "application" layer, which runs protocols used by user applications for network communication. These higher-layer protocols include the File Transfer Protocol (FTP) and the Simple Mail Transfer Protocol (SMTP).

The TCP/IP layer 3 "transport" layer provides services requested by higher-layer user applications and protocols. Transport-layer protocols function as a hardware-independent transport mechanism that attempts to ensure that a data packet sent by a higher-layer application reaches its destination.

TCP/IP layer 2 is a "network" or "Internet" layer that provides services necessary to route data packets between networks. Network layer protocols respond to a service request from a higher-layer protocol, wherein the higher-layer protocol requires the requested service in order to enable communications between networked entities. In a virtualized environment, these networked entities may be attached to different virtual local area networks ("VLANs") on the same physical base host computer.

Network-layer protocols identify a networked entity (or "node") attached to a physical or virtual network by a string of identifying characters known as that node's Internet Protocol ("IP") address. Networked entities may be assigned either a permanent (or "static") IP address or a "dynamic" IP address that may be changed or reassigned.

TCP/IP layer 1 is the "link" or "data link" layer, which moves data between nodes on the same local network (or "link"). Protocols operating at the link layer identify each node with a unique address that may be called a "Media Access Control" ("MAC") address. Multiple entities, each identified at the network layer by a unique IP address, may correspond to a single link layer entity and MAC address. But no IP address may be associated with more than one MAC address.

In the TCP/IP protocol stack model, Address Resolution Protocol ("ARP") is a link layer protocol that can be used by network layer TCP/IP protocols to identify the link layer MAC address associated with a particular network layer IP address. In TCP/IP systems based on the IPv6 standard, ARP functionality is incorporated into the newer Neighbor Discovery Protocol ("NDP").

Networked entities may use the Address Resolution Protocol to identify the MAC address associated with an IP address by transmitting an "ARP request" message. ARP requests comprise one or more broadcast data packets. A broadcast data packet is a data packet that does not identify a specific recipient. Every networked entity that is in range of a broadcast packet receives the packet and determines what type of response, if any, is required. A data packet that is not a broadcast packet may be a multicast packet, which is addressed to a specific list of recipients, or a unicast packet, which is addressed to one recipient.

A networked entity that receives an ARP request message determines whether the IP address specified by the ARP request identifies the receiving networked entity. If the IP address does identify the receiving networked entity, that receiving networked entity responds by transmitting an "ARP response" message that returns the receiving networked entity's MAC address. Upon receiving the ARP response, the querying entity that sent the original ARP request is able to associate the IP address identified by the ARP request with the MAC address returned by the ARP response. This associating allows the querying entity that sent the original ARP request to communicate with the entity identified by the MAC address returned by the ARP response Embodiments of the present invention provide tamper-proof link-layer isolation among workloads in a multi-tenant virtualized computing environment, wherein that virtualized computing environment comprises the four-layer TCP/IP model described above. Other embodiments may provide similar functionality and features at analogous layers of other protocol stacks and network models, such as the seven-layer Open Systems Interconnection ("OSI") model.

Embodiments of the present invention may be implemented as a virtual machine ("VM") appliance that exists as either a single instance of a virtual machine or as a network of virtual machines. Other embodiments may provide similar functionality, comprise similar logical components, and perform similar methods in other networked environments. Other embodiments may be implemented as one or more physical devices or as a mixture of physical and virtual entities.

Figure 1:
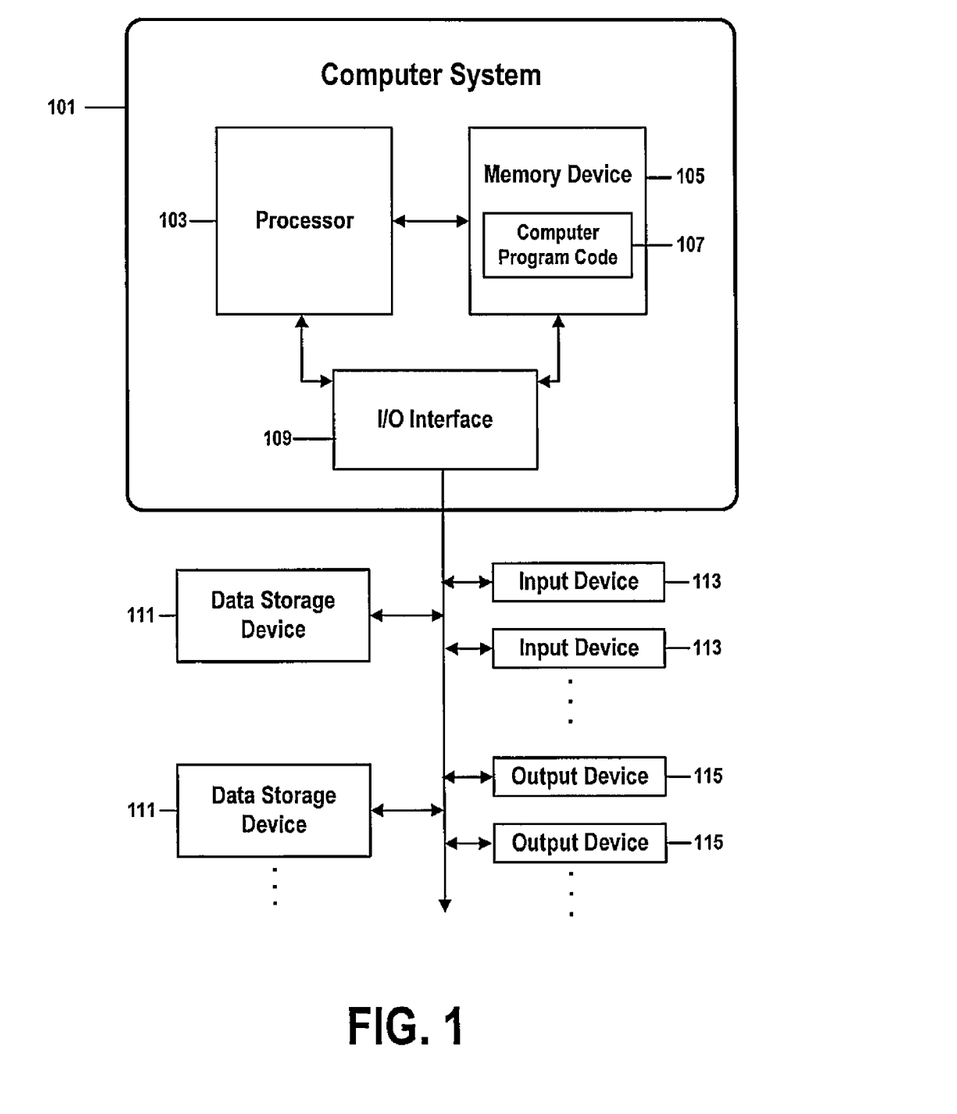
FIG. 1 shows the structure of a computer system and computer program code that may be used to implement a method for enhanced isolation and security hardening among multi-tenant workloads in accordance with embodiments of the present invention.

FIG. 1 shows the structure of a computer system and computer program code that may be used to implement a method for enhanced isolation and security hardening among multi-tenant workloads in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for enhanced isolation and security hardening among multi-tenant workloads in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for enhanced isolation and security hardening among multi-tenant workloads.

Any of the components of the present invention could be created, integrated, hosted, maintained, deployed, managed, serviced, supported, etc. by a service provider who offers to facilitate a method for enhanced isolation and security hardening among multi-tenant workloads. Thus the present invention discloses a process for deploying or integrating computing infrastructure, comprising integrating computer-readable code into the computer system 101, wherein the code in combination with the computer system 101 is capable of performing a method for enhanced isolation and security hardening among multi-tenant workloads.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

Figure 2:
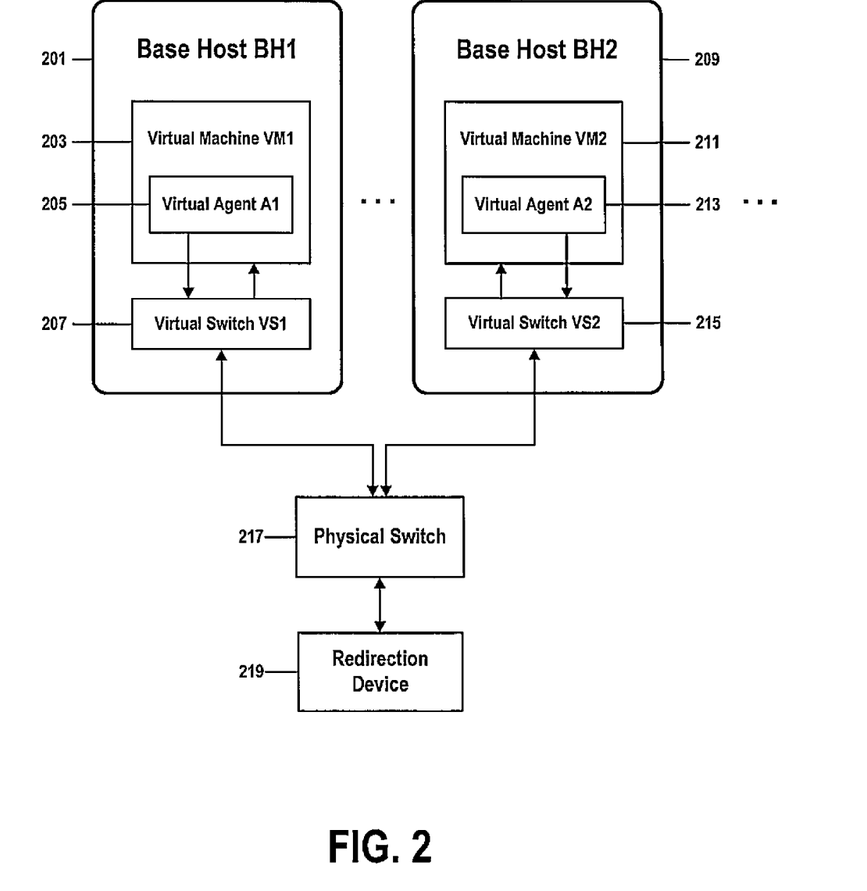
FIG. 2 shows the physical layout of virtual and physical components in conformance with embodiments of the present invention and as described in FIG. 3.

FIG. 2 shows the logical layout of virtual and physical components in conformance with embodiments of the present invention and as described in FIG. 3. FIG. 2 shows elements identified by reference numbers 201-219.

Reference number 201 identifies a physical base host computer BH1 connected to a computer network, wherein base host BH1 hosts one or more virtual machines, serves one or more tenants, and supports one or more workloads. BH1 may run a "host" operating system (or "hypervisor") under which one or more "guest" operating systems run, wherein one or more virtual machines run as programs under the one or more guest operating systems. A tenant may be any type of computer user. Tenants may share a workload and a tenant may be associated with multiple workloads. In other embodiments, a workload may be split across multiple physical base host machines.

Reference number 203 identifies a virtual machine VM1 running on base host BH1 201. Virtual machine 203 may be associated with one or more tenants and one or more workloads. A virtual machine is a software implementation of a computer that runs programs and appears to users to be a physical machine. Virtual machine 203 presents to its users a virtual computing environment running under a "guest" operating system, wherein the guest operating system runs as a program under the host operating system of base host 201.

Virtual machine 203 may be any type of virtual computing environment and may be implemented at different layers of the host operating system and of the communications infrastructure or through any technology known to those skilled in the art, wherein such technologies include, but are not limited to hardware virtualization, hypervisor virtualization, full virtualization, process virtualization, or application virtualization.

In embodiments, base host BH1 201 may be a physical computer that is not hosting a virtualized environment. In such embodiments, virtual machine VM1 203, virtual agent A1 205, and virtual switch VS1 207 are not implemented as virtual machines hosted by BH1, but may be instead implemented as processes running on physical base host BH1, as distinct virtual or physical networked appliances, such as firewalls, or as some other type of networked entity. In other embodiments, virtual switch 207 may be implemented as a group of virtual switches.

Reference number 205 identifies a virtual-machine agent virtual agent A1, which is a software program installed on virtual machine 203. Virtual agent 205 runs as one or more processes under the guest operating system of virtual machine 203 and performs isolation and security functions in conformance with embodiments of the present invention. Virtual agent 205 may work in conjunction with virtual switch 207 to help intercept, validate, and process certain types of messages sent by virtual machine 203 before those messages reach physical switch 217.

Reference number 207 identifies a virtual switch VS1, which may run as a software program on base host 201 and may provide isolation, control and content inspection functions between virtual machines. Virtual switch 207 performs network-switching and routing functions in conformance with embodiments of the present invention and may work with virtual agent 205 to help intercept, validate, and process certain types of messages sent by virtual machine 203 before those messages reach physical switch 217. In embodiments wherein a workload runs in a nonvirtualized environment on physical machine BH1, rather than running a virtual machine in a virtualized environment hosted by BH1, the functionality of virtual switch VS1 may be performed by one or more hardware or software firewalls, gateways, or other types of hardware or software network-management or filtering appliances, other types of networked entities, or combinations thereof.

Physical switch 217 is a computer networking device that connects a combination of network backbone segments and entities attached to networks. Physical switch 217 may perform a variety of functions related to directing data packets between networked entities. Examples of such physical switches include network bridges, which process and route data at the data link layer, and layer 3 (or "multi-layer") switches, which may operate at multiple layers.

Reference number 219 identifies a physical or virtual redirection device that may be a hardware or software appliance that helps change the destination address of a data packet from an original destination address to a different destination address. In some embodiments, a redirection device is a network-attached "directory server" computer system.

Reference numbers 209-215 show a second base host computer BH2 that comprises component entities 211-215 analogous to components 203-207 of base host BH1 201. These analogous entities comprise a virtual machine VM2 (211), a virtual agent A2 (213) and a virtual switch VS2 (215), all of which run under one or more guest operating systems that in turn run under base machine's BH2 host operating system. Embodiments of the present invention may comprise other similar base machines that each run virtual appliances analogous to reference numbers 203-207 or 211-215.

In other embodiments, physical computers and external devices that do not host virtualized environments may be attached to the network or may be linked through the network to base host BH1 201 through physical switch 217. In such embodiments, the present invention may provide a method for enhanced isolation and security hardening between virtual machine VM1 203 and said physical computers and external devices that do not host virtualized environments, wherein such method is analogous to the method described in FIGS. 2 and 3. In such embodiments, physical computers and external devices that do not host virtualized environments may not implement one or more of the functional blocks described in FIGS. 2 and 3, such as virtual agent 205 or 213 or virtual switch 207 or 215 as virtual machines.

Figure 3:
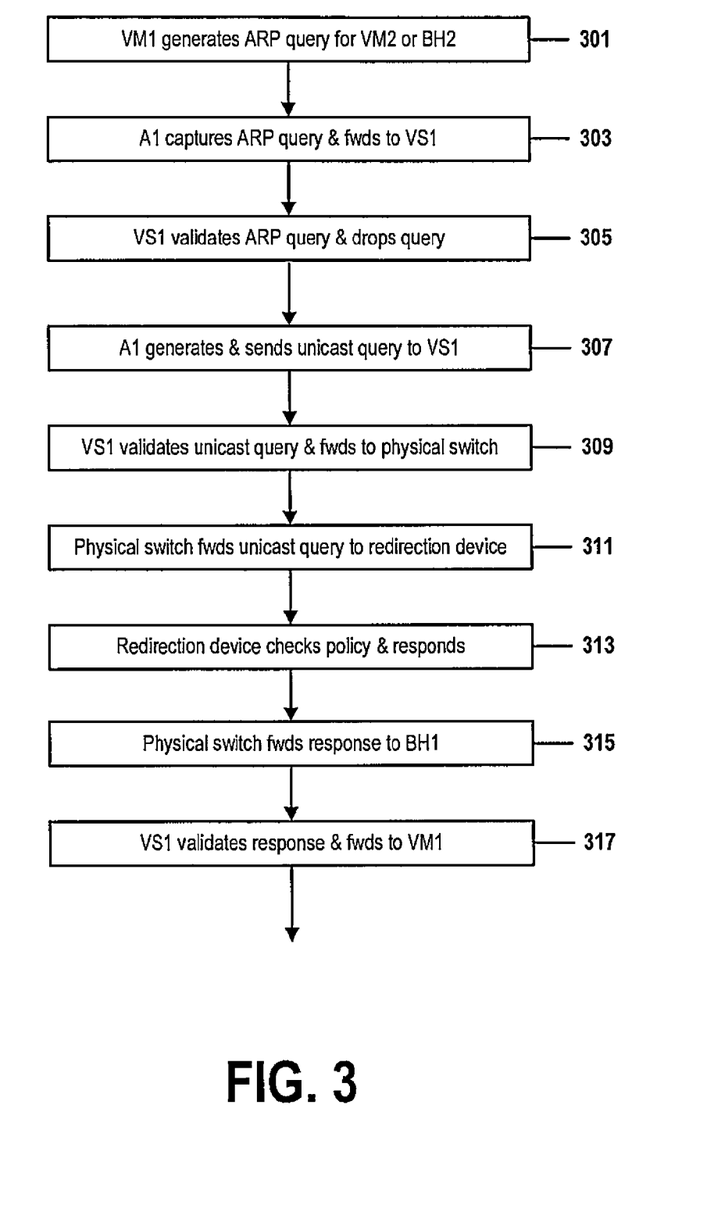
FIG. 3 illustrates the steps of a method of providing full isolation and security hardening among multi-tenant networked workloads in conformance with embodiments of the present invention as performed by the components illustrated in FIG. 2.

FIG. 3 illustrates the steps of a method of providing full isolation and security hardening among multi-tenant networked workloads in conformance with embodiments of the present invention as performed by the components illustrated in FIG. 2. FIG. 3 contains steps 301-317, which may be performed by components represented by references 201-219 in FIG. 2 or by analogous components in embodiments mentioned in the description of FIG. 2.

In step 301, a virtual machine VM1 (203 of FIG. 2) generates an address-resolution query that specifies an IP address of a "target" virtual machine VM2 (213 of FIG. 2) and requests a link layer Media Access Control ("MAC") address that corresponds to the specified network layer IP address of VM2. This address-resolution query may conform to the format defined by the Address Resolution Protocol ("ARP") implemented in standards and protocols that include Internet Standard STD 37, Internet Protocol v4, and Asynchronous Transfer Mode. In other embodiments, the address-resolution query may conform to the Neighbor Discovery Protocol ("NDP") of Internet Protocol v6. In embodiments, the address-resolution query may specify an IP address of a target physical machine or an external networked device, rather than a virtual machine VM2 213.

A "destination" address in an ARP address-resolution query is a MAC address that identifies an entity or entities that receive a message or a data packet that comprise the ARP address-resolution query. A "target" address in an ARP address-resolution query is an IP address that identifies an entity with which a querying entity seeks to establish communication. A message or data packet may be broadcast to all networked entities by addressing the message or data packet to an arbitrary "broadcast" destination MAC address. In some embodiments, this special broadcast MAC address may be FF:FF:FF:FF:FF:FF.

The address-resolution query may thus broadcast a layer 2 Internet Protocol address (the "target IP address" that identifies a target networked entity) to all accessible nodes of a network in expectation of receiving an ARP response from the target networked entity, wherein the ARP response identifies the link layer MAC address associated with the target networked entity. Because the querying entity VM1 (203) does not initially know the MAC address of the target networked entity, the address-resolution query is generally broadcast to the MAC addresses of all appropriate nodes of the network.

When a target entity identified by a query message's target IP address receives a broadcast ARP query, the target entity normally returns its MAC address to the querying entity in an ARP address-resolution response message sent directly to the querying entity. A querying entity that receives such an ARP response message may then use the received MAC address of the original target networked entity to establish a connection with the target entity.

This standard ARP address-resolution protocol may not provide adequate security and isolation in a multi-tenant virtualized networked environment because the standard ARP address-resolution protocol does not prevent an unauthenticated entity from responding to an ARP address-resolution query. If such a response identifies a MAC address of a hostile entity, the original querying entity could be tricked into communicating with that hostile entity.

The present invention protects a virtual machine from such attacks by disabling the virtual machine's ability to broadcast messages, including ARP address-resolution queries, to all network-attached entities. This disabling can be accomplished by configuring physical switches, virtual switches, or other network-management or control devices, through methods well-known to those skilled in the art of network administration. In an environment wherein broadcast messages are disabled, broadcast messages are not allowed to reach the network backbone through a physical switch like that identified by reference number 217 in FIG. 2.

In step 303, a virtual-machine agent A1 (205 in FIG. 2) intercepts the broadcast ARP address-resolution query before it leaves virtual machine 203 and before the broadcast query message can reach the physical switch. Agent A1 205 then forwards the intercepted broadcast query message to virtual switch VS1 (207 in FIG. 2).

In step 305, virtual switch 207, following an embedded rule barring broadcast transmissions, does not allow the broadcast ARP address-resolution query to be sent. In embodiments, these embedded rules may be embedded in a firewall device or program. In embodiments that run under a Linux or other Unix-derived operating system, these embedded rules may be implemented as one or more "ebtables" filters that delete broadcast messages before they reach virtual switch 207. Other filtering or firewall mechanisms well-known to those skilled in the art of communications architecture may be implemented to perform similar functions. In other embodiments, a broadcast message may be allowed to reach a physical switch 217 that is configured to drop broadcast messages before they can reach the network.

In step 307, virtual agent 205 generates a unicast version of the dropped broadcast ARP query, wherein the unicast version is comprised of one or more unicast data packets that are addressed to a single "target" network-attached entity. The virtual agent 205 may convert each of the one or more broadcast data packets that comprised the original broadcast ARP address-resolution query into one or more unicast packets, replacing the special broadcast destination MAC address embedded in the ARP query with a MAC address of a redirection device (219 in FIG. 2). In some embodiments, this special target MAC address may be 00:00:00:00:00:00. Virtual agent 205 then forwards to virtual switch 207 the resulting unicast version of the original broadcast query message, wherein the unicast version comprises the one or more unicast data packets.

In step 309, virtual switch 207 verifies the validity of a packet of a unicast query received from virtual agent 205. This verification may include confirmation that: i) the packet is a unicast packet; ii) the packet was sent from a MAC address that correctly identifies virtual machine 203; iii) the packet is part of an ARP address-resolution request that specifies a special target MAC address; or iv) the packet is part of an ARP address-resolution request that specifies a destination MAC address that identifies a valid redirection device. In some embodiments, virtual switch 207 may consider combinations of other verification criteria in step 309. In the trivial case, the verification of the validity of a packet or of the unicast query is limited to mere verification that the packet or the query is of a form that is capable of being transported across the network.

If virtual switch 207 verifies the validity of a unicast query packet, it forwards the validated query packet to a physical switch 217.

In step 311, physical switch 217, upon receiving the validated unicast query packet from virtual switch 207, forwards the validated unicast data packet to an entity identified by that data packet's destination MAC address. In this embodiment, each destination MAC address was verified in step 309 to correctly identify a valid redirection device.

A redirection device is any networked entity or component of a networked entity that may receive a query and respond to the query in a manner determined by preset rules, functions, or policies. A redirection device may be any distinct entity or any component of a distinct entity that can receive queries and send responses in an appropriate format. A redirection device may comprise, but is not limited to, a processor configured to function as a directory server, one or more programmable physical base machines configured with special software, a general or specialized hardware device, standalone or distributed computer software, or one or more virtual machines.

In step 313, the valid redirection device 219 identified by the validated unicast data packet's destination MAC address receives the unicast version of the original broadcast query from physical switch 217, wherein the unicast version of the original broadcast query comprises the one or more validated unicast data packets. The valid redirection device 219 may respond to the receipt of the validated unicast query message by sending to physical switch 217 a response message, wherein the response message is comprised of one or more data packets, and wherein the content each of the one or more data packets is determined by policy guidelines.

Policy guidelines may include, but are not limited to, constraints upon which entities are included or may be included in a trusted physical network, in a virtual network, workgroup, or in other types of groups.

If policy guidelines permit, redirection device 219 responds to the validated unicast query message by sending a response message to physical switch 217, wherein the response message is comprised of one or more data packets. If policy guidelines permit communication between the querying entity (here, virtual machine VM1 (203 in FIG. 2)) and the target entity (here, virtual machine VM2 (211 in FIG. 2)), then the response message sent by redirection device 219 may be an enabling response message that identifies the requested target MAC address of VM2. If the target entity is a physical device or computer, rather than a virtual machine, the response message sent by redirection device 219 may instead identify the requested target MAC address of the physical device or computer. The enabling response message may be formatted as an ARP response message and may comprise one or more data packets.

In step 315, physical switch 217 receives a unicast enabling response message sent by redirection device 219 in step 313 and then forwards the unicast enabling response message to base machine BH1 (201).

In step 317, virtual switch VS1 (207) receives a unicast enabling response message forwarded by physical switch 217 in step 315, wherein virtual switch 207 is configured to capture incoming messages sent from physical switch 217 to base machine 201.

Virtual switch VS1 (207) may then verify the validity of each packet of the received enabling response message received from physical switch 217. This verification may include confirmation that: i) the packet is a unicast packet, not a broadcast or multicast packet; and ii) the packet was sent from a MAC address that falls within a range of MAC addresses that identify valid redirection devices. In some embodiments, virtual switch 207 may consider different verification criteria in step 317. In the trivial case, the verification of the validity of a packet or of the unicast query is limited to mere verification that the packet or the query is of a form that is capable of being transported across the network.

Virtual switch 207 then retrieves the MAC address or virtual switch port number of querying entity virtual machine VM1 203 by referring to information stored in a MAC address table that is accessible to virtual switch 207, and forwards the ARP response packet to virtual machine VM1 203 at the retrieved MAC address or virtual switch port number of querying entity virtual machine VM1 203. Virtual machine VM1 203 receives the one or more data packets that make up the ARP response message sent by virtual switch 207, then reassembles the packets into a complete ARP response message. The virtual operating system of querying virtual machine VM1 203 thus learns the MAC address of target virtual machine VM2 211, enabling properly validated communications between VM1 203 and VM2 211.

In an example, a security policy may require a virtual machine VM1 (203 in FIG. 2) to be isolated from a virtual machine VM2 (211 in FIG. 2). If VM1 203 tries to initiate communications with VM2 211, VM1 must first attempt to identify VM2's MAC address by sending an ARP query message. Because of the isolation constraint dictated by the security policy, a redirection device 219 will not grant a request from VM1 203 for the MAC address of VM2, thereby isolating VM1 from VM2. In such a case, redirection device 219 may ignore the address request, return a system-level error, return a diagnostic text, return a user-readable error message, create a log entry for at least one of VM1 and VM2, transmit a warning to a system administrator, or perform some other task specified by policy guidelines.

In some embodiments, additional security may be provided by changing the MAC address of VM1 203 at fixed, preset, or irregular intervals, or at times determined by the occurrence or nonoccurrence of some condition. In such cases, VM1 203 must repeat the method of steps 301-317 each time VM1's MAC address changes in order to send VM1's new MAC address to a target virtual machine 211 or to a target base host BH2 209. This mechanism terminates an attack that had been made possible when an attacker managed to obtain a prior MAC address of VM1 203 because, once the MAC address of VM1 203 changes, the attacker will no longer be able to determine VM1's current MAC address. This prevents the attacker from initiating even unidirectional communications with VM1 203. This additional security mechanism may be used in combination with any of the embodiments of the present invention described in FIGS. 2-4.

Figure 4:
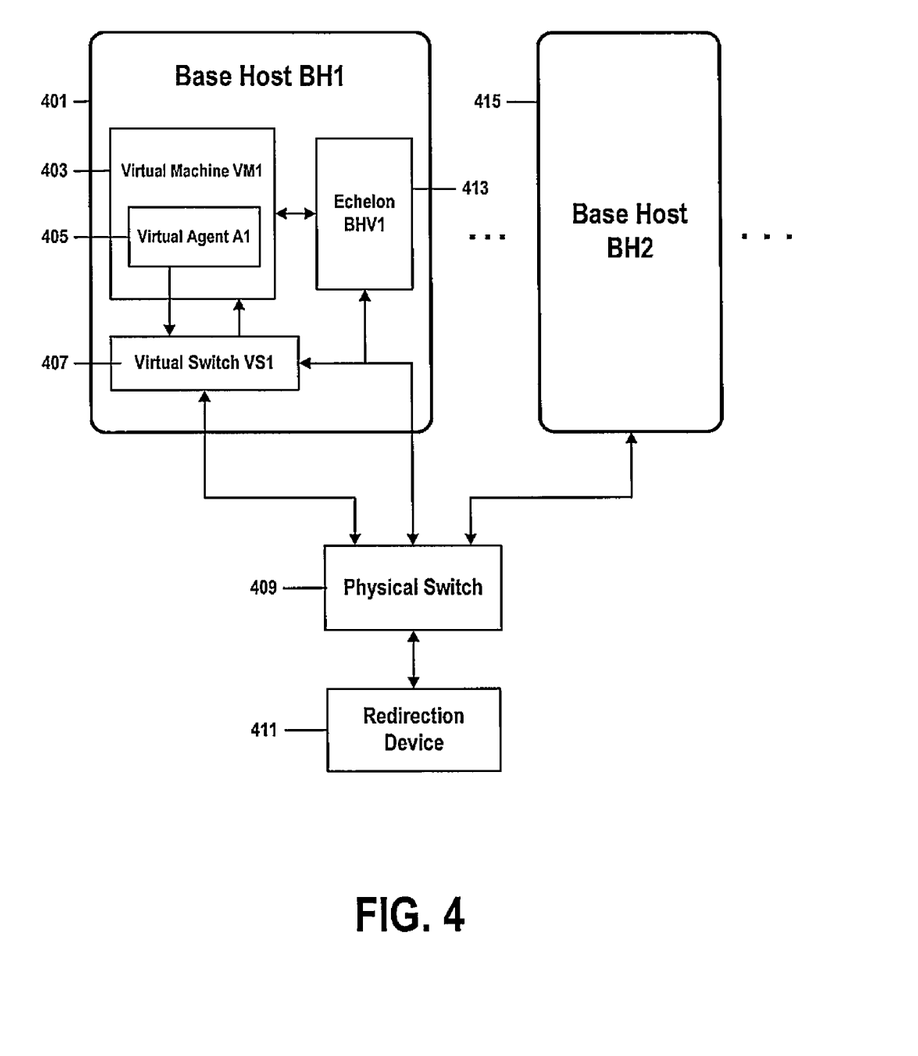
FIG. 4 shows an embodiment of the present invention that incorporates one or more "Echelon" entities in order to provide more granular security.

FIG. 4 shows an embodiment of the present invention that incorporates one or more "Echelon" entities in order to provide more granular security. Rather than completely isolating a pair of networked entities from each other, this embodiment may implement more nuanced security policies that merely limit or constrain communications between networked entities. FIG. 4 comprises reference numbers 401-415.

Reference numbers 401, 403, 405, and 407 respectively identify a physical base host computer BH1, a virtual machine VM1, a virtual agent A1, and a virtual switch S1 that are analogous to components respectively identified by reference numbers 201, 203, 205, and 207 in FIG. 2.

Reference numbers 409 and 411 respectively identify a physical switch and a redirection device that are analogous to components respectively identified by reference numbers 217 and 219 in FIG. 2.

Reference number 413 shows an Echelon entity BHV1 that is implemented in this as a virtual machine running on physical base host BH1 (401). In this embodiment, Echelon entity 401 is a virtual machine running on the same base host 401 that hosts virtual machine 403, virtual agent 405, and virtual switch 407. In other embodiments, Echelon functionality may be provided by other types of physical or virtual appliances configured to perform packet-filtering and policy-enforcement functions similar to those described below.

Reference number 415 identifies a second base host computer BH2 that contains components (not shown in FIG. 4) analogous to components identified by reference numbers 403, 405, 407, and 413 in base host BH2 401. The embodiment of FIG. 4 may contain additional networked base host computers that are similar to BH1 401 and BH2 415.

The Echelon-enhanced embodiment of FIG. 4 is generally similar to the embodiments described in FIG. 2 and FIG. 3. But in an Echelon-enhanced embodiment, the validation and redirection steps performed by a virtual agent A1 405 and by a virtual switch VS1 407, as described in FIG. 3 steps 303-309 and 313, may be complemented or supplanted by the potentially more nuanced validation and filtering functions of an Echelon entity 413.

FIG. 4 illustrates a general case wherein an Echelon entity 413 may exchange bidirectional communications with a virtual machine VM1 403, a virtual switch 407, and a physical switch 409. In this embodiment, an Echelon entity is implemented as a virtual machine on every base host (401, 415) incorporated into the present invention.

In other embodiments, Echelon entity 413 may be connected in a different topology to some or all of components 403-409. The Echelon entity 413 may, for example, be configured to intercept all communications between two or more of components 401-409. In other embodiments, an Echelon entity may not be implemented as a virtual machine that shares a single base host with other virtual machines, instead existing as a virtual machine on a different base host or as a physically distinct hardware or software appliance or other networked entity.

As described below, an Echelon entity 413 may perform any of a broad range of communications-filtering functions that constrain or limit communications between tenants in a multi-tenant networked environment. In FIG. 4, this performance may require an incoming message addressed to a tenant of a base host BH1 401 to be redirected to an Echelon entity 413 before the incoming message can reach its destination tenant. This performance may also require an outgoing message sent by a virtual machine running on BH1 401 to be redirected to an Echelon entity 413 before the message is allowed to reach a switching mechanism like a virtual switch or a physical switch.

In the embodiment of FIG. 4, redirection may be performed by a redirection device 411, in a variation of step 313 of FIG. 3. In this variation of step 313, a redirection device 411 ensures that a message communicated between virtual machines, which may include virtual machines running on the same host processor, will be delivered, not to the destination virtual machine to which the message was originally addressed, but instead to the Echelon entity 413. The Echelon entity 413 will then evaluate, process, and respond to the forwarded message, permitting the forwarded message to reach its originally intended destination only if doing so does not violate any isolation or security policy enforced by the Echelon entity 413.

Redirection device 411 may, in a modified step 313, perform this redirection by responding with a MAC address of Echelon entity BHV1 413 instead of replying with a MAC address of target VM2 211. This redirection will cause data packets that querying entity VM1 403 subsequently attempts to send to target VM2 211 to instead be diverted to the Echelon entity BHV1 413. This diversion of data packets to the Echelon entity BHV1 413 will not be ascertainable by VM1 403.

When the Echelon entity 413 receives such a redirected packet, it may perform one or more operations upon the received redirected packet, wherein the one or more operations are selected by one or more rules, wherein those rules may be functions of user priorities; characteristics of the network infrastructure, network topology, system implementation, or configuration; the content, format, or type of data packet; the identity or status of the entities sending or receiving the packet; or other implementation-specific criteria. These rules may, for example, direct the Echelon entity BHV1 413 to log, forward, drop, or modify the packet.

Implementations and configuration of Echelon entity 413 may vary considerably, but in all cases, an Echelon entity 413 will act as a smart filtering entity capable of using complex criteria to decide how to respond to requests to communicate with a tenant of a multi-tenant networked environment, even when a request is sent by a sending tenant that shares the destination tenant's LAN, virtual LAN, network segment, or base host. An Echelon entity 413 may intercept and perform operations on communications moving in either direction between virtual machine VM1 403 and a virtual or physical target entity.

The Echelon-enhanced embodiment shown in FIG. 4 differs from other isolation and security hardware or software mechanisms based on firewalls, gateways, routers, or other host-based or network-attached communications-management entities, because the shown in FIG. 4 may limit or constrain communications between networked entities attached to the same network segment or local-area network ("LAN") and between networked entities that reside on the same physical base host computer 401.

Such limitations or constraints may comprise policies that include, but are not limited to, rules for filtering out certain types of messages or packets, for logging or monitoring certain types of communications, for dropping messages that do or do not conform to certain protocols or standards, for forcing ingoing or outgoing communications through certain virtual or physical ports or machines, or for managing traffic to optimize bandwidth consumption.

Such rules may be functions of criteria that comprise, but are not limited to, combinations of message content type, levels of network congestion, time of day, resource availability, the identity of a sending or of a destination entity, the status of a sending or of a destination entity, contractual obligations, or network-administration issues.

In an example, an Echelon-enhanced embodiment of the present invention could constrain communications between a first virtual machine and a second virtual machine, wherein the first virtual machine serves large media files to the second virtual machine, and wherein the constraining comprises limiting the exchange of streaming-media packets between the two virtual machines during peak hours or when certain network resources fall below a threshold value.

Echelon-enhanced embodiments of the present invention may log connections between virtual machines, wherein connection logs track data that may comprise, but is not limited to, connection times, source and destination IP addresses, source and destination port addresses, source and destination MAC addresses, or the entire contents of selected data packets or messages. An Echelon entity that is owned by a third party may generate logs that contain objective audit data for competing tenants of a multi-tenant environment.

A hardware or software filtering mechanism based on firewalls, gateways, routers, or other host-based or network-attached communications-management entities cannot provide equivalent functionality in a multi-tenant virtualized environment because communications between entities attached to the same local-area network or network segment do not pass through gateway-class filtering and network-management devices. Since distinct virtual machines may be co-located on a single physical base host or may be located on physically distinct base hosts attached to the same LAN or network segment, a gateway or a firewall configured as a gateway may not be able to enforce the type of granular limitations or constraints described above when running in a multi-tenant or multi-workload virtualized environment.

The embodiment of FIG. 4 uses "Echelon" entities to provide granular security in multi-tenant networked environments, wherein said multi-tenant networked environments may comprise virtual machines that share the same physical base host and wherein virtual machines or base hosts may share a common LAN or network segment. A virtual agent 405, a virtual switch 407, an Echelon entity 413, or some combination thereof, may run on the same base host.

An Echelon entity may be any virtual machine or physical entity that can partially isolate virtual machines by running enhanced isolation and security software under a secure operating system. This enhanced isolation and security software may perform some functions similar to those performed by a firewall or an intrusion-protection system. This enhanced isolation and security software may be tailored to incorporate or accommodate compatible software-based network-security mechanisms already deployed in a multi-tenant networked environment.

In embodiments, this enhanced isolation and security software may perform functions that comprise, but are not limited to, restricting access to certain communication protocols and ports, inspecting and reporting the status of connections, ensuring that proper handshake and connection establishment takes place before data is transferred, restricting the number of new connections established per time interval, rate-limiting certain types of traffic, or restricting the number of parallel connections between virtual machines in order to protect against hostile access, such as denial-of-service attacks.

In more advanced implementations, Echelon-enhanced embodiments of the present invention may also perform functions related to transparent dynamic native-address-translation (DNAT), proxy communications, anti-malware and anti-spam applications, caching, load-balancing, application-specific logging, intrusion prevention, or general content filtering.

Tenants of a multi-tenant networked environment may develop custom templates for Echelon entities that allow the tenants to implement and provision Echelon entities without support from the provider of the multi-tenant networked environment. Tenants may also implement proprietary security policies and technologies through Echelon entities without support from the provider of the multi-tenant networked environment.

What is claimed is:

1. A method for enhanced isolation and security hardening between workloads in a multi-tenant networked environment, said method comprising:

a querying networked entity connected to a computer network generating and attempting to transmit a broadcast or multicast query to a target networked entity connected to the computer network by means of a physical switch connected to the computer network, wherein the broadcast or multicast query requests a media-access control address of the target networked entity, wherein the querying networked entity comprises a first virtual machine running on a first processor, a virtual switch running on the first processor that is configured to disable the querying networked entity's ability to send broadcast or multicast messages, and a virtual-machine agent running on the first processor, wherein the target networked entity is distinct from the querying networked entity, wherein the target networked entity is selected from a group comprising a second computer system, a second virtual machine running on a second processor of a second computer system, and an other networked device, wherein the virtual-machine agent prevents the querying networked entity from sending the broadcast or multicast query to the physical switch by intercepting the broadcast or multicast query before the broadcast or multicast query leaves the virtual machine and forwarding the intercepted message to the virtual switch;

the virtual agent creating a unicast query addressed to a redirection device, wherein the unicast query requests the media-access control address of the target networked entity, and then sending the unicast query to the virtual switch;

the virtual switch receiving and verifying the unicast query, wherein the receiving and verifying comprises confirming that each packet of the unicast query specifies a media-control address that identifies the querying networked entity as a sender of the unicast query;

the virtual switch directly or indirectly forwarding the verified unicast query to the physical switch;

the physical switch receiving the verified unicast query and directly or indirectly forwarding the verified unicast query to the redirection device, such that the target networked entity does not receive a request for the media-access control address of the target networked entity;

the physical switch receiving a response from the redirection device, wherein the response identifies a media-access control address that enables communication with the target networked entity and wherein the response further identifies a redirection media-access control address associated with the redirection device;

the physical switch forwarding the received response to the virtual switch by means of the computer network;

the virtual switch further verifying the response by confirming that the redirection media-access control address identifies a valid redirection device; and the virtual switch forwarding the verified response to the querying networked entity.

2. The method of claim 1, wherein said broadcast or multicast query conforms to a protocol comprising Internet Protocol v.4 Address Resolution Protocol or Internet Protocol v.6 Neighbor Discovery Protocol.

3. The method of claim 1, wherein a media-access control address of said querying networked entity changes at regular or irregular intervals.

4. The method of claim 1, wherein said media-access control address that enables communication with said target networked entity is the media-access control address of a smart security device, wherein said smart security device intercepts and performs operations upon communications intended to be exchanged between said querying networked entity and said target networked entity, and wherein said security device comprises a third virtual machine running on said first processor, a third processor of a third computer system, a third virtual machine running on a third processor of a third computer system, or a networked device.

5. The method of claim 4, wherein said operations comprise:

exchanging bidirectional communications with the first virtual machine, the virtual switch, and the physical switch;

limiting or constraining communications between networked entities attached to a same network segment of the computer network or attached to a same local-area network comprised by the computer network;

limiting or constraining communications between networked entities that reside on a same physical base host computer;

forcing ingoing or outgoing communications through certain a virtual or physical port of a device attached to the computer network;

performing transparent dynamic native-address-translation (DNAT);

managing proxy communications;

running anti-malware and anti-spam applications;

caching and load-balancing system resources;

running intrusion-prevention applications;

optimizing bandwidth consumption among networked entities configured to a same network segment of the computer network or attached to a same local-area network comprised by the computer network as a function of a combination of message content type, a level of network congestion, a time of day, an availability of a particular resource, an identity of a sending or of a destination entity, a status of a sending or of a destination entity, or a contractual obligation; and tracking and logging audit data, wherein the audit data comprising: networked-device connection times, source and destination IP addresses of messages, source and destination port addresses for a network communication, source and destination MAC addresses for a network communication, or an entire content of selected data packets or messages.

6. The method of claim 5, wherein said plurality of rules is defined by said querying networked entity.

7. A computer program product, comprising a computer-readable hardware storage device having a computer-readable program code stored therein, said program code configured to be executed by a first processor of a first computer system to implement a method for enhanced isolation and security hardening between workloads in a multi-tenant networked environment, said method comprising:

a querying networked entity connected to a computer network generating and attempting to transmit a broadcast or multicast query to a target networked entity connected to the computer network by means of a physical switch connected to the computer network, wherein the broadcast or multicast query requests a media-access control address of the target networked entity, wherein the querying networked entity comprises a first virtual machine running on a first processor, a virtual switch running on the first processor that is configured to disable the querying networked entity's ability to send broadcast or multicast messages, and a virtual-machine agent running on the first processor, wherein the target networked entity is distinct from the querying networked entity, wherein the target networked entity is selected from a group comprising a second computer system, a second virtual machine running on a second processor of a second computer system, and an other networked device, wherein the virtual-machine agent prevents the querying networked entity from sending the broadcast or multicast query to the physical switch by intercepting the broadcast or multicast query before the broadcast or multicast query leaves the virtual machine and forwarding the intercepted message to the virtual switch;

the virtual agent creating a unicast query addressed to a redirection device, wherein the unicast query requests the media-access control address of the target networked entity, and then sending the unicast query to the virtual switch;

the virtual switch receiving and verifying the unicast query, wherein the receiving and verifying comprises confirming that each packet of the unicast query specifies a media-control address that identifies the querying networked entity as a sender of the unicast query;

the virtual switch directly or indirectly forwarding the verified unicast query to the physical switch;

the physical switch receiving the verified unicast query and directly or indirectly forwarding the verified unicast query to the redirection device, such that the target networked entity does not receive a request for the media-access control address of the target networked entity;

the physical switch receiving a response from the redirection device, wherein the response identifies a media-access control address that enables communication with the target networked entity and wherein the response further identifies a redirection media-access control address associated with the redirection device;

the physical switch forwarding the received response to the virtual switch by means of the computer network;

the virtual switch further verifying the response by confirming that the redirection media-access control address identifies a valid redirection device; and the virtual switch forwarding the verified response to the querying networked entity.

8. The computer program product of claim 7, wherein said broadcast or multicast query conforms to a protocol comprises Internet Protocol v.4 Address Resolution Protocol or Internet Protocol v.6 Neighbor Discovery Protocol.

9. The computer program product of claim 7, wherein a media-access control address of said querying networked entity changes at regular or irregular intervals.

10. The computer program product of claim 7, wherein said media-access control address that enables communication with said target networked entity is the media-access control address of a smart security device, wherein said smart security device intercepts and performs operations upon communications intended to be exchanged between said querying networked entity and said target networked entity, and wherein said security device comprises a third virtual machine running on said first processor, a third processor of a third computer system, a third virtual machine running on a third processor of a third computer system, or a networked device.

11. The computer program product of claim 10, wherein said operations comprise:

exchanging bidirectional communications with the first virtual machine, the virtual switch, and the physical switch;

limiting or constraining communications between networked entities attached to a same network segment of the computer network or attached to a same local-area network comprised by the computer network;

limiting or constraining communications between networked entities that reside on a same physical base host computer;

forcing ingoing or outgoing communications through certain a virtual or physical port of a device attached to the computer network;

performing transparent dynamic native-address-translation (DNAT);

managing proxy communications;

running anti-malware and anti-spam applications;

caching and load-balancing system resources;

running intrusion-prevention applications;

optimizing bandwidth consumption among networked entities configured to a same network segment of the computer network or attached to a same local-area network comprised by the computer network as a function of a combination of message content type, a level of network congestion, a time of day, an availability of a particular resource, an identity of a sending or of a destination entity, a status of a sending or of a destination entity, or a contractual obligation; and tracking and logging audit data, wherein the audit data comprising: networked-device connection times, source and destination IP addresses of messages, source and destination port addresses for a network communication, source and destination MAC addresses for a network communication, or an entire content of selected data packets or messages.

12. The computer program product of claim 11, wherein said plurality of rules is defined by said querying networked entity.

13. A first computer system comprising a first processor, a memory coupled to said first processor, and a computer-readable hardware storage device coupled to said first processor, said storage device containing program code configured to be run by said first processor via the memory to implement a method for enhanced isolation and security hardening between workloads in a multi-tenant networked environment, said method comprising:

a querying networked entity connected to a computer network generating and attempting to transmit a broadcast or multicast query to a target networked entity connected to the computer network by means of a physical switch connected to the computer network, wherein the broadcast or multicast query requests a media-access control address of the target networked entity, wherein the querying networked entity comprises a first virtual machine running on a first processor, a virtual switch running on the first processor that is configured to disable the querying networked entity's ability to send broadcast or multicast messages, and a virtual-machine agent running on the first processor, wherein the target networked entity is distinct from the querying networked entity, wherein the target networked entity is selected from a group comprising a second computer system, a second virtual machine running on a second processor of a second computer system, and an other networked device, wherein the virtual-machine agent prevents the querying networked entity from sending the broadcast or multicast query to the physical switch by intercepting the broadcast or multicast query before the broadcast or multicast query leaves the virtual machine and forwarding the intercepted message to the virtual switch;

the virtual agent creating a unicast query addressed to a redirection device, wherein the unicast query requests the media-access control address of the target networked entity, and then sending the unicast query to the virtual switch;

the virtual switch receiving and verifying the unicast query, wherein the receiving and verifying comprises confirming that each packet of the unicast query specifies a media-control address that identifies the querying networked entity as a sender of the unicast query;

the virtual switch directly or indirectly forwarding the verified unicast query to the physical switch;

the physical switch receiving the verified unicast query and directly or indirectly forwarding the verified unicast query to the redirection device, such that the target networked entity does not receive a request for the media-access control address of the target networked entity;

the physical switch receiving a response from the redirection device, wherein the response identifies a media-access control address that enables communication with the target networked entity and wherein the response further identifies a redirection media-access control address associated with the redirection device;

the physical switch forwarding the received response to the virtual switch by means of the computer network;

the virtual switch further verifying the response by confirming that the redirection media-access control address identifies a valid redirection device; and the virtual switch forwarding the verified response to the querying networked entity.

14. The system of claim 13, wherein said broadcast or multicast query conforms to a protocol that comprises Internet Protocol v.4 Address Resolution Protocol or Internet Protocol v.6 Neighbor Discovery Protocol.

15. The system of claim 13, wherein a media-access control address of said querying networked entity changes at regular or irregular intervals.

16. The system of claim 13, wherein said media-access control address that enables communication with said target networked entity is the media-access control address of a smart security device, wherein said smart security device intercepts and performs operations upon communications intended to be exchanged between said querying networked entity and said target networked entity, and wherein said security device comprises a third virtual machine running on said first processor, a third processor of a third computer system, a third virtual machine running on a third processor of a third computer system, or a networked device.

17. The system of claim 16, wherein said operations comprise:

exchanging bidirectional communications with the first virtual machine, the virtual switch, and the physical switch;

limiting or constraining communications between networked entities attached to a same network segment of the computer network or attached to a same local-area network comprised by the computer network;

limiting or constraining communications between networked entities that reside on a same physical base host computer;

forcing ingoing or outgoing communications through certain a virtual or physical port of a device attached to the computer network;

performing transparent dynamic native-address-translation (DNAT);

managing proxy communications;

running anti-malware and anti-spam applications;

caching and load-balancing system resources;

running intrusion-prevention applications;

optimizing bandwidth consumption among networked entities configured to a same network segment of the computer network or attached to a same local-area network comprised by the computer network as a function of a combination of message content type, a level of network congestion, a time of day, an availability of a particular resource, an identity of a sending or of a destination entity, a status of a sending or of a destination entity, or a contractual obligation; and tracking and logging audit data, wherein the audit data comprising: networked-device connection times, source and destination IP addresses of messages, source and destination port addresses for a network communication, source and destination MAC addresses for a network communication, or an entire content of selected data packets or messages.

18. The system of claim 17, wherein said plurality of rules is defined by said querying networked entity.

19. A process for supporting computer infrastructure, said process comprising providing at least one support service for at least one of creating, integrating, hosting, maintaining, and deploying computer-readable program code in a first computer system, wherein the program code in combination with said first computer system is configured to implement a method for enhanced isolation and security hardening between workloads in a multi-tenant networked environment, said method comprising:

a querying networked entity connected to a computer network generating and attempting to transmit a broadcast or multicast query to a target networked entity connected to the computer network by means of a physical switch connected to the computer network, wherein the broadcast or multicast query requests a media-access control address of the target networked entity, wherein the querying networked entity comprises a first virtual machine running on a first processor, a virtual switch running on the first processor that is configured to disable the querying networked entity's ability to send broadcast or multicast messages, and a virtual-machine agent running on the first processor, wherein the target networked entity is distinct from the querying networked entity, wherein the target networked entity is selected from a group comprising a second computer system, a second virtual machine running on a second processor of a second computer system, and an other networked device, wherein the virtual-machine agent prevents the querying networked entity from sending the broadcast or multicast query to the physical switch by intercepting the broadcast or multicast query before the broadcast or multicast query leaves the virtual machine and forwarding the intercepted message to the virtual switch;

the virtual agent creating a unicast query addressed to a redirection device, wherein the unicast query requests the media-access control address of the target networked entity, and then sending the unicast query to the virtual switch;

the virtual switch receiving and verifying the unicast query, wherein the receiving and verifying comprises confirming that each packet of the unicast query specifies a media-control address that identifies the querying networked entity as a sender of the unicast query;

the virtual switch directly or indirectly forwarding the verified unicast query to the physical switch;

the physical switch receiving the verified unicast query and directly or indirectly forwarding the verified unicast query to the redirection device, such that the target networked entity does not receive a request for the media-access control address of the target networked entity;

the physical switch receiving a response from the redirection device, wherein the response identifies a media-access control address that enables communication with the target networked entity and wherein the response further identifies a redirection media-access control address associated with the redirection device;

the physical switch forwarding the received response to the virtual switch by means of the computer network;

the virtual switch further verifying the response by confirming that the redirection media-access control address identifies a valid redirection device; and the virtual switch forwarding the verified response to the querying networked entity.

20. The method of claim 19, wherein said broadcast or multicast query conforms to a protocol comprising Internet Protocol v.4 Address Resolution Protocol or Internet Protocol v.6 Neighbor Discovery Protocol.

21. The method of claim 19, wherein a media-access control address of said querying networked entity changes at regular or irregular intervals.

22. The method of claim 19, wherein said media-access control address that enables communication with said target networked entity is the media-access control address of a smart security device, wherein said smart security device intercepts and performs operations upon communications intended to be exchanged between said querying networked entity and said target networked entity, and wherein said security device comprises a third virtual machine running on said first processor, a third processor of a third computer system, a third virtual machine running on a third processor of a third computer system, or a networked device.

23. The method of claim 22, wherein said operations comprise:

exchanging bidirectional communications with the first virtual machine, the virtual switch, and the physical switch;

limiting or constraining communications between networked entities attached to a same network segment of the computer network or attached to a same local-area network comprised by the computer network;

limiting or constraining communications between networked entities that reside on a same physical base host computer;

forcing ingoing or outgoing communications through certain a virtual or physical port of a device attached to the computer network;

performing transparent dynamic native-address-translation (DNAT);

managing proxy communications;

running anti-malware and anti-spam applications;

caching and load-balancing system resources;

running intrusion-prevention applications;

optimizing bandwidth consumption among networked entities configured to a same network segment of the computer network or attached to a same local-area network comprised by the computer network as a function of a combination of message content type, a level of network congestion, a time of day, an availability of a particular resource, an identity of a sending or of a destination entity, a status of a sending or of a destination entity, or a contractual obligation; and tracking and logging audit data, wherein the audit data comprising: networked-device connection times, source and destination IP addresses of messages, source and destination port addresses for a network communication, source and destination MAC addresses for a network communication, or an entire content of selected data packets or messages.

24. The method of claim 23, wherein said plurality of rules is defined by said querying networked entity.

\* \* \* \* \*